(12) United States Patent
Suzuki et al.

(10) Patent No.: US 6,556,919 B2
(45) Date of Patent: Apr. 29, 2003

(54) MAP DATA STORAGE MEDIUM

(75) Inventors: Hidenobu Suzuki, Toyota (JP);
Yoshimasa Furuike, Chiryu (JP);
Yasuhiro Tooyama, Okazaki (JP);
Hiroshi Takeuchi, Nishinomiya (JP);
Isao Ogawa, Yokohama (JP)

(73) Assignees: Toyota Jidosha Kabushiki Kaisha, Toyota (JP); Denso Corporation, Kariya (JP); Aisin AW Co., Ltd., Anjo (JP); Fujitsu Ten Limited, Kobe (JP); Matsushita Electric Industrial Co., Ltd., Kadoma (JP)

(*) Notice: Subject to any disclaimer, the term of this patent is extended or adjusted under 35 U.S.C. 154(b) by 0 days.

(21) Appl. No.: 09/540,762

(22) Filed: Mar. 31, 2000

(65) Prior Publication Data
US 2001/0051851 A1 Dec. 13, 2001

(30) Foreign Application Priority Data
Apr. 9, 1999 (JP) ............ 11-102417

(51) Int. Cl.⁷ ............ G06F 165/00
(52) U.S. Cl. ............ 701/208; 701/211; 340/990; 345/112
(58) Field of Search ............ 701/208, 211; 340/990, 995; 345/112, 501

(56) References Cited
U.S. PATENT DOCUMENTS

| | | |
|---|---|---|
| 4,937,572 A | 6/1990 | Yamada et al. ............ 340/995 |
| 5,486,822 A | 1/1996 | Tenmoku et al. |
| 5,742,924 A | 4/1998 | Nakayama |
| 5,839,088 A | 11/1998 | Hancock et al. |
| 6,006,160 A * | 12/1999 | Tamaki et al. ............ 701/208 |
| 6,006,161 A * | 12/1999 | Katou ............ 701/212 |
| 6,023,653 A * | 2/2000 | Ichimura et al. ............ 701/208 |
| 6,023,655 A * | 2/2000 | Nomura ............ 701/208 |
| 6,122,200 A * | 9/2000 | Campardo et al. ...... 365/185.23 |
| 6,122,594 A * | 9/2000 | Tamaki et al. ............ 701/208 |
| 6,141,014 A * | 10/2000 | Endo et al. ............ 345/427 |

FOREIGN PATENT DOCUMENTS

| | | |
|---|---|---|
| DE | 197 09 773 | 10/1997 |
| EP | 0 280 795 | 9/1988 |
| JP | 60-239876 | 11/1985 |
| JP | 2240680 A | 9/1990 |
| JP | 10-333553 | 12/1998 |

* cited by examiner

Primary Examiner—William A. Cuchlinski, Jr.
Assistant Examiner—Olga Hernandez
(74) Attorney, Agent, or Firm—Kenyon & Kenyon

(57) ABSTRACT

Map data is divided into meshes of a prescribed size. Treating four meshes as one group, mesh numbers are assigned to the meshes following an N pattern. After numbers are assigned to the four meshes, these four meshes are collected as one, and numbers are assigned to respective meshes following an N pattern. The map data storage medium stores the map data according to mesh number. As a result, data portions for areas located in close proximity are positioned in close proximity in the map database (storage medium), to thereby improve access efficiency.

8 Claims, 10 Drawing Sheets

|    |    |    |    |    |    |    |    |   |
|----|----|----|----|----|----|----|----|---|
| 66 |    |    |    |    |    |    |    |   |
| 65 | 67 | ·  | ·  | ·  | ·  | ·  | ·  | · |
| 22 | 24 | 30 | 32 | 54 | 56 | 62 | 64 | · |
| 21 | 23 | 29 | 31 | 53 | 55 | 61 | 63 | · |
| 18 | 20 | 26 | 28 | 50 | 52 | 58 | 60 | · |
| 17 | 19 | 25 | 27 | 49 | 51 | 57 | 59 | · |
| 6  | 8  | 14 | 16 | 38 | 40 | 46 | 48 | · |
| 5  | 7  | 13 | 15 | 37 | 39 | 45 | 47 | · |
| 2  | 4  | 10 | 12 | 34 | 36 | 42 | 44 | · |
| 1  | 3  | 9  | 11 | 33 | 35 | 41 | 43 | · |

Fig. 3

| |
|---|
| TOYOTA SCHOOL FOUNDATION |
| TOYOTA MOTOR CORPORATION |
| TOYOTA AUTOMATIC LOOM WORKS, LTD |

Fig. 9

| | |
|---|---|
| TOYOTA SCHOOL FOUNDATION | |
| TOYOTA MOTOR CORPORATION | TAKAOKA FACTORY |
| | TSUTSUMI FACTORY |
| | FACTORY AT HEADQUARTERS |
| | MOTOMACHI FACTORY |
| TOYOTA AUTOMATIC LOOM WORKS, LTD | |

MAP DATA STORAGE MEDIUM

BACKGROUND OF THE INVENTION

1. Field of the Invention

The present invention relates to a map data storage medium (database) for storing map data divided into a plurality of meshes, and to a map information retrieving apparatus or a navigation apparatus utilizing the medium.

2. Description of the Related Art

The number of vehicles provided with on-vehicle navigation apparatuses for route guidance is increasing. Such a navigation apparatus is typically equipped with a map database carried on a storage medium such as a DVD, identifies a current position detected by a GPS (global positioning system) apparatus or the like as a position on the map, and displays the position. When a destination is set, an optimum route from the current position to the destination is searched for. More specifically, with data on road network contained in the map database, the shortest distance between the present position and the destination is searched for using linear programming to retrieve the optimum route. In addition to the distance, a route requiring the shortest time can be obtained by using stored data on speed at which the vehicle travels on the road. The map database also contains data on facilities of various types, and therefore, by entering a facility to be searched for, such as a department store, a convenience store, a train station, or a hospital, information on such facilities located around the current position can be retrieved.

For arranging and storing map data in the map database, the map is divided into a plurality of meshes as a matrix, and a mesh number is assigned to each of the meshes. The meshes are classified into primary meshes, secondary meshes, and so on. The map is roughly divided into primary meshes, which are further divided into secondary meshes, which are further subdivided into tertiary meshes. By thus dividing the map data into meshes for storage and allocating a mesh number to each mesh, map data for an area corresponding to a designated mesh number can be obtained.

However, mesh numbers are conventionally assigned according to how they are arranged in the matrix. As a result, it is often the case that neighboring meshes are not necessarily assigned with contiguous numbers. More specifically, while the problem is not so significant for primary meshes because the division is quite rough, secondary meshes located adjacent to each other are often assigned with quite distant numbers because the numbers are assigned according to how they are arranged in the primary mesh.

Further, map data for a relatively wide area must be searched for in order to obtain information on a facility. In such a case, the time required for the search increases when the map data portions to be retrieved are allocated with distant mesh numbers. In addition, when the world map is concerned, mesh allocation methods are not standardized, requiring separate systems be created for respective areas and data on the manner of allocating the meshes be provided.

SUMMARY OF INVENTION

The present invention has been conceived in view of the above problems, and aims to provide a map database allowing efficient number assignment.

A map data storage medium (database) according to the present invention stores map data divided into a plurality of meshes. Starting from a base mesh, a prescribed number of meshes located in close proximity are sequentially assigned with numbers following an order determined by a prescribed rule. The assignment process is repeated using another mesh as the base mesh. By thus assigning numbers to respective meshes, sorted map data is stored in accordance with the assigned numbers.

Thus, adjacent meshes are numbered in accordance with a prescribed rule, and the map data portions are stored in numerical order, whereby data portions for the meshes adjacent on the map are located in close proximity on the storage medium. Because the map database is often used to search a relatively wide area and data portions are located in close proximity on the storage medium, efficiency in accessing the storage medium for a search is improved.

Preferably, after numbers are assigned to the prescribed number of meshes as described above, the meshes having the assigned numbers are collected as one large mesh. Further, the number assignment process is then applied to other large meshes following the order determined by the above prescribed rule. For the meshes included in each of the large meshes, numbers are sequentially assigned to adjacent meshes following the order determined by the above prescribed rule. A prescribed number of the large meshes are further collected to form an even larger mesh. The number assignment process is then applied to such larger meshes following the order determined by the above prescribed rule, and numbers are assigned to each mesh in these larger meshes. By repeating the above-described process, numbers are assigned to the entire map.

The above-described process makes it possible to assign numbers worldwide according to a prescribed rule, and to build a systematic map database.

Preferably, the above prescribed rule includes a basic rule in which numbers are assigned to four meshes following an N pattern, starting from a base mesh and proceeding to a mesh above the base, a mesh on the right thereof, and then a mesh on the upper right thereof. Such rule is relatively simple, and also allows numbers to be sequentially assigned to meshes located in close proximity.

The map data preferably includes a building ID for identifying a building. The building ID is used to identify a building and facilitate a search for facilities in the same building. The map data for display only contains the building ID and the detailed data can be stored in different space and accessed using the building ID, to thereby enhance speed of scrolling the displayed map.

Preferably, a plurality of meshes are collected to form an integrated mesh, and the above mesh number includes an integrated mesh number which is a mesh number for one of the plurality of meshes forming the integrated mesh. By thus forming an integrated mesh, map data can be retrieved collectively, leading to efficient access.

The map information retrieving apparatus according to the present invention is characterized in that the above-described map data storage medium is used to retrieve map information.

The navigation apparatus according to the present invention is characterized in that the above-described map data storage medium is used for route guidance.

BRIEF DESCRIPTION OF THE DRAWINGS

FIGS. 3 and 4 illustrate mesh numbering.

FIGS. 9 and 10 illustrate examples of displaying search results.

FIG. 11 illustrates configuration of records.

DESCRIPTION OF PREFERRED EMBODIMENT

A preferred embodiment of the present invention will next be described with reference to the drawings.

[Overall Configuration]

Figure 1:
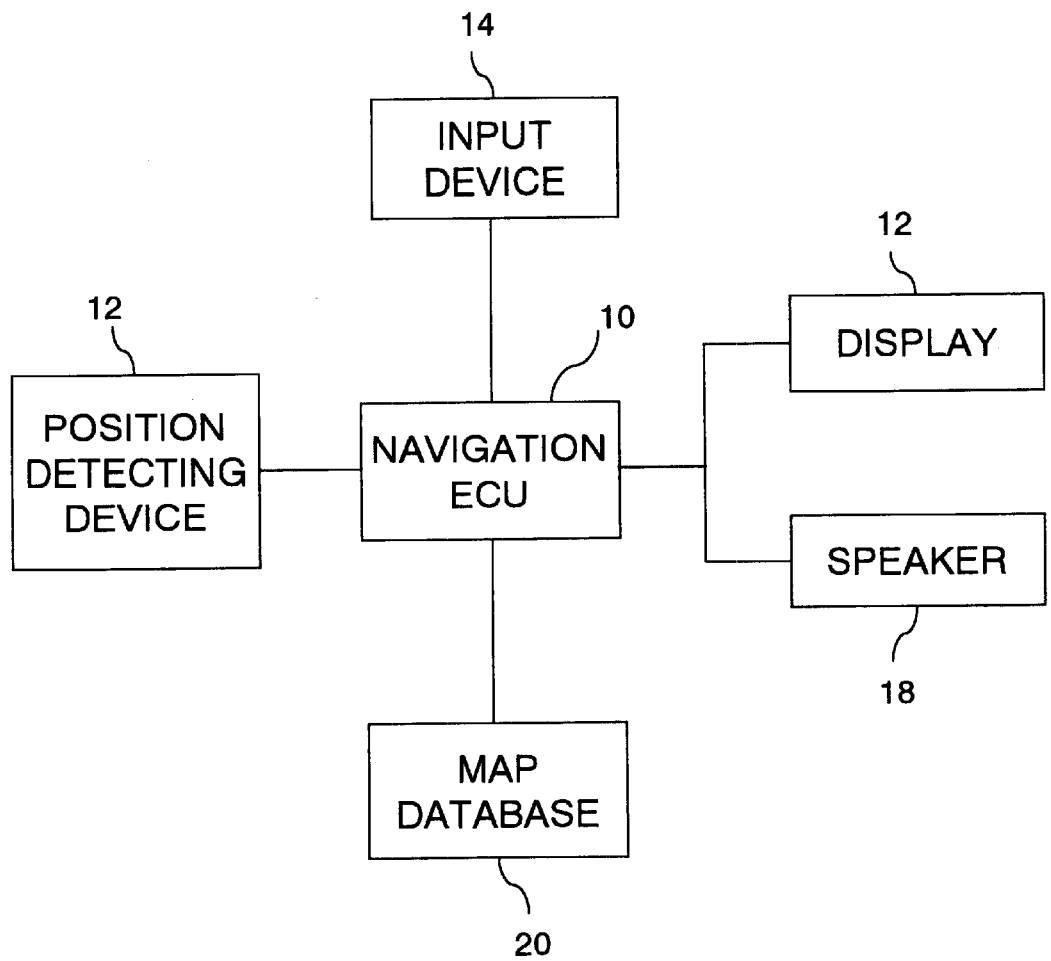
FIG. 1 is a block diagram illustrating a configuration of the present apparatus.

FIG. 1 is a block diagram illustrating an overall configuration of a navigation apparatus. A navigation ECU 10 performs various types of data processing for navigation, and is connected to a variety of devices as shown in the figure.

A position detecting device 12 including a GPS device or the like detects the current position of a vehicle. Various devices such as D-GPS devices, beacon receivers, and azimuth detecting devices may be employed. An input device 14 is used for entering commands such as operation commands, and formed by operation buttons, a touch panel, or the like. A display 16 presents a map image or the like used for navigation. When the input device 14 is a touch panel, the display 16 is preferably provided with a touch switch on a front surface thereof. A speaker 18 provides audio output of route guidance, operation guidance, and the like.

A map database 20 contains various map data. The navigation ECU 10 utilizes the map data to search for routes and facilities and display a map image. The map database 20 is carried on a storage medium such as a CD-ROM, a DVD, a hard disk, or the like.

When, for example, a destination is set and a route thereto is to be searched for, the input device 14 is used for entering the destination. The destination can be input by, for example, entering the name or telephone number of the destination to cause the display 16 to present a corresponding map, and then touching a position of interest on the map. In response to such input of the destination, the navigation ECU 10 searches data on road network contained in the map database 20 for an optimum route from the current position to the destination. For this search, various search methods including Dikstra method may be employed. When a route is set, the set route and the current position are shown on the display 16, and route guidance is carried out. Preferably, guidance on right or left turn at intersections are given by showing the direction on the display 16 as well as by speech from the speaker 18.

[Configuration of Map Database]

The map database 20 contains map data on the region where the vehicle travels. For example, for a vehicle travelling in Japan, the map database 20 may have stored therein nationwide map data of Japan. When traveling in Europe, map data of the countries of Europe can be stored therein.

In the map database 20 according to the present embodiment, the entire world is divided into search meshes (units of divided area) having a prescribed size, and each search mesh is assigned a unique number used for arrangement.

Figure 2:
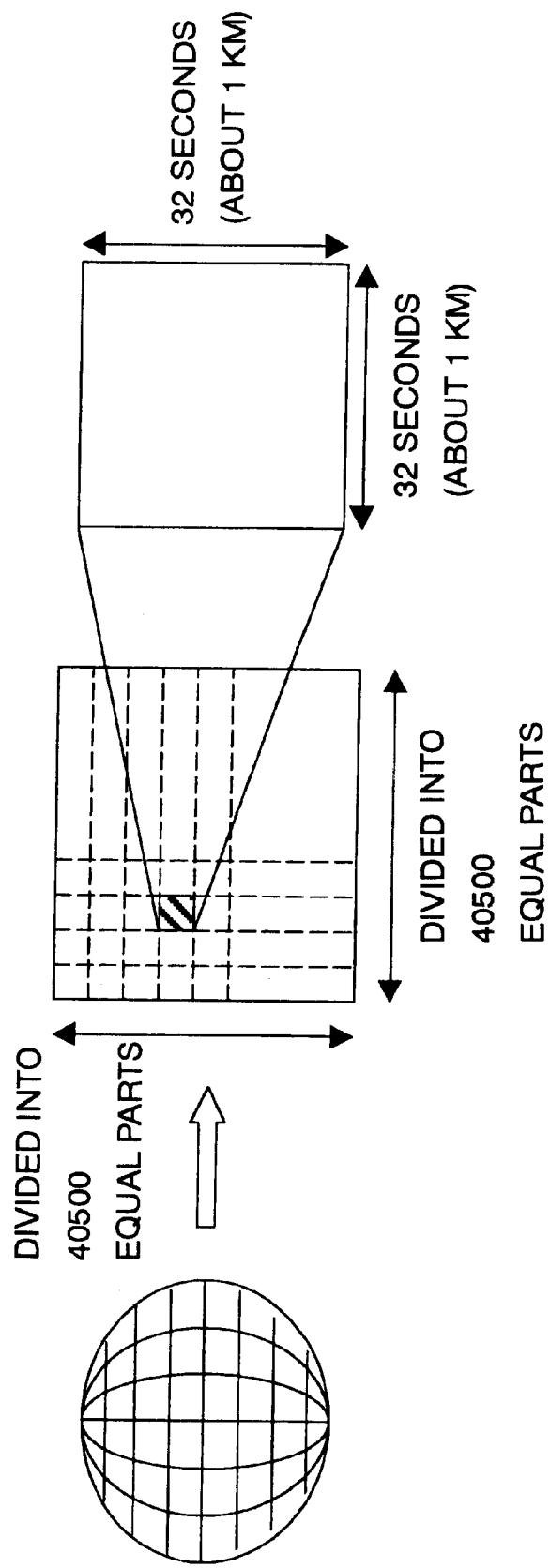
FIG. 2 illustrates configuration of meshes.

More specifically, referring to FIG. 2, the entire world is divided into 40500×40500 search meshes. Consequently, one search mesh has a size corresponding to 32 seconds×32 seconds in terms of angle, or about 1 km×1 km in terms of distance.

Figure 4:
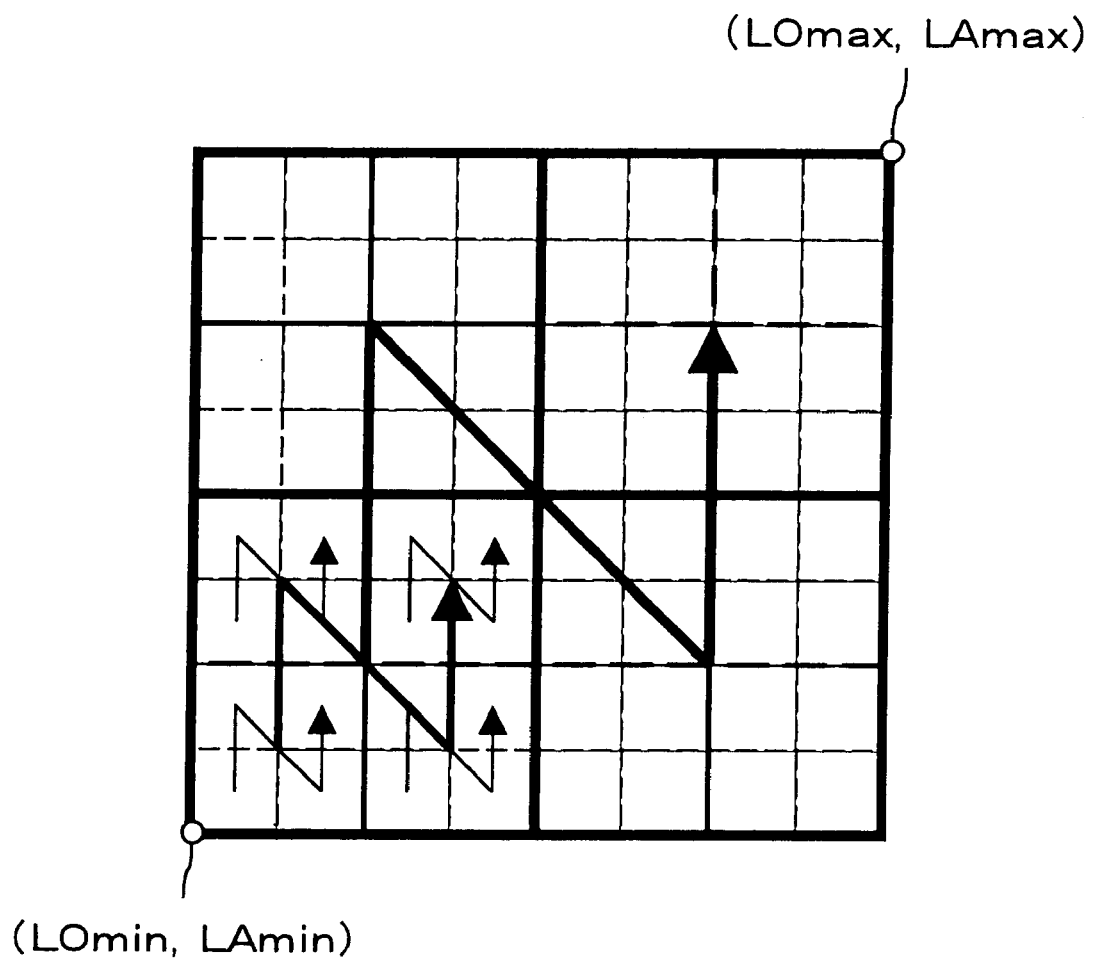

Using a location at (minimum longitude (LOmin), minimum latitude (LAmin)) as an initial base point, respective search meshes are sequentially assigned with numbers following an N pattern. More specifically, referring to FIGS. 3 and 4, the lower left mesh is assigned number 1, and numbers are sequentially assigned to adjoining meshes following an N pattern. When four search meshes are assigned with numbers from 1 to 4, a mesh formed by these four meshes is used as a unit, the assignment process proceeds following an N pattern to sequentially allocate numbers to respective search meshes, and this process is repeated. The upper right point at (maximum longitude (LOmax), maximum latitude (LAmax)) is the base point that is assigned with the last number.

Figure 5:
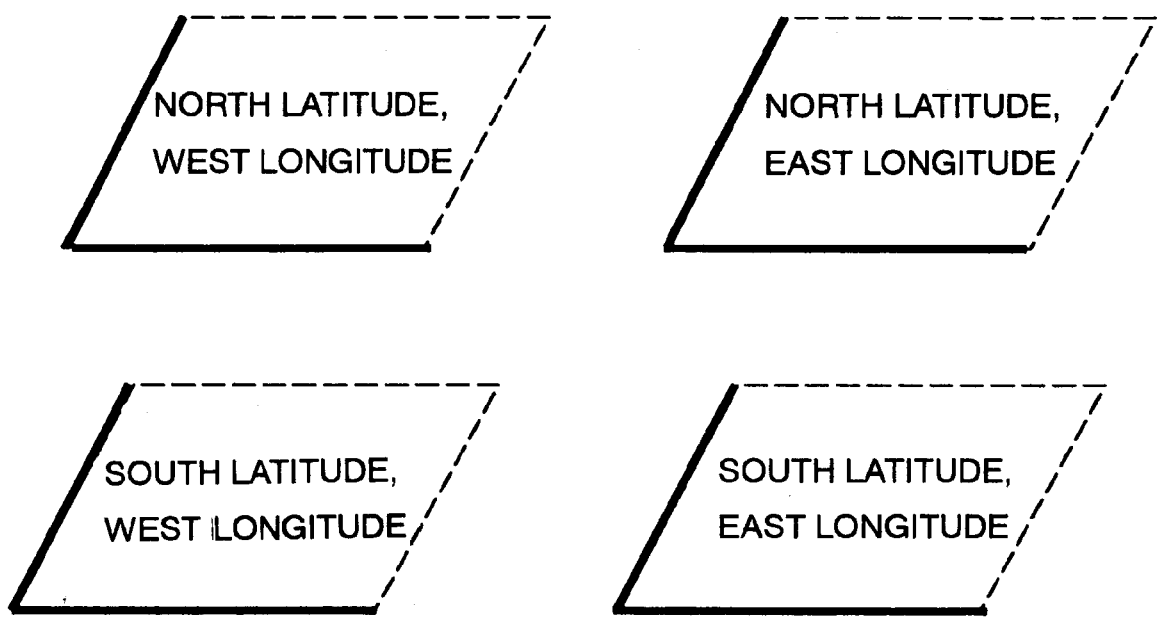
FIG. 5 illustrates borders of the meshes.

Thus, as shown in FIG. 5, the entire world is divided into four areas: north latitude, west longitude area; north latitude, east longitude area; south latitude, west longitude area; and south latitude, east longitude area. For each of these areas, mesh numbers are sequentially assigned to the search meshes starting from the mesh located at the minimum latitude and longitude and ending with the mesh located at the maximum latitude and longitude. The area to which a point on the border belongs is determined by defining each area to include a point at the minimum longitude and latitude or over and exclude a point at the maximum longitude or latitude. Borders of the lower side and the left side indicated by solid lines in the figure are included in the respective areas.

In the map database 20, the map data is stored according to mesh numbers. That is, the map database 20 is carried on a storage medium such as a CD-ROM, a DVD, a hard disk, or the like, and the map data is linearly arranged and stored in order of mesh number.

Navigation apparatuses often require adjacent map data portions for displaying a map or searching for a facility. According to the present embodiment, mesh numbers are assigned to respective search meshes following an N pattern. As a result, search meshes located in close proximity are assigned proximate mesh numbers, and are located in close proximity on the storage medium, allowing for rapid and efficient access to the stored data.

[Integrated Mesh]

As described above, the map data is stored based on the search meshes, each of which basically has a fixed size (1 km×1 km in the above example) determined by longitude and latitude. When an area surrounding a certain point is to be searched, the search range may be, for example, a 10 kilometer circle. For this range, as many as 100 search meshes are searched. Consequently, data acquisition will be inefficient if data is sequentially retrieved for one search mesh after another.

Figure 6:
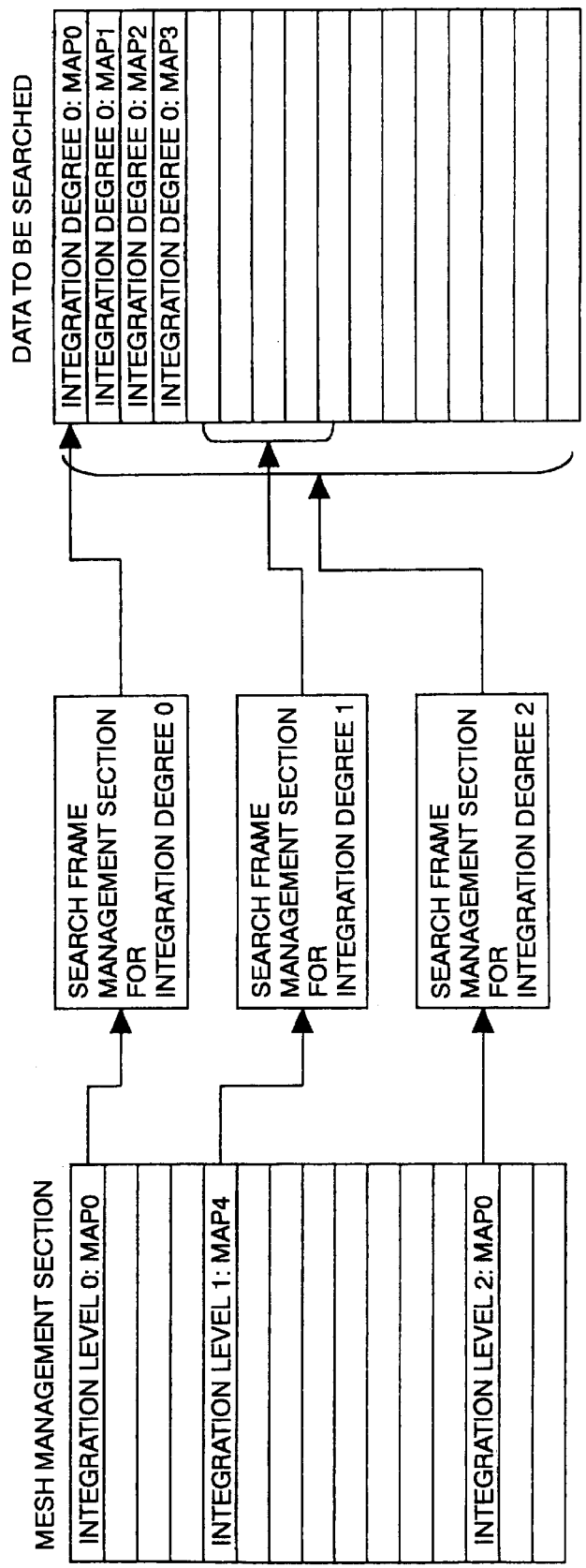
FIG. 6 illustrates integration of the meshes.

Therefore, referring to FIG. 6, a certain number of search meshes are preferably integrated for management. More specifically, a collection of four search meshes is regarded as a mesh at an integration degree 1, and a collection of 16 search meshes as a mesh at an integration degree 2. Thus, $4^n$ meshes are collectively treated wherein n denotes the degree of integration.

A mesh management section stores mesh numbers in accordance with the degree of integration. For a mesh assigned with number 1 at integration degree 0, a search frame management section for integration degree 0 accesses the map data portion having a mesh number MAP1. For an access to a mesh number MAP4 at integration degree 1, a search frame management section for integration degree 1 is used and the map data portions assigned with mesh numbers MAP4–MAP7 are accessed. Further, for an access to the mesh number MAP0 at integration degree 2, a search frame management section for integration degree 2 is used and the map data portions assigned with mesh numbers MAP0–MAP15 are accessed.

Thus, access to the map data can efficiently be achieved corresponding to the search range by using integration degree data.

In addition, by thus providing a search frame management section for each integration degree, only a single set of searched data at integration degree 0 is necessary, and this data can be shared for respective integration degrees. The searched data includes information such as a type code (category of facility), coordinates (position of facility), a pointer to position information (address at which detailed data of the facility is stored), and the like.

Figure 7:
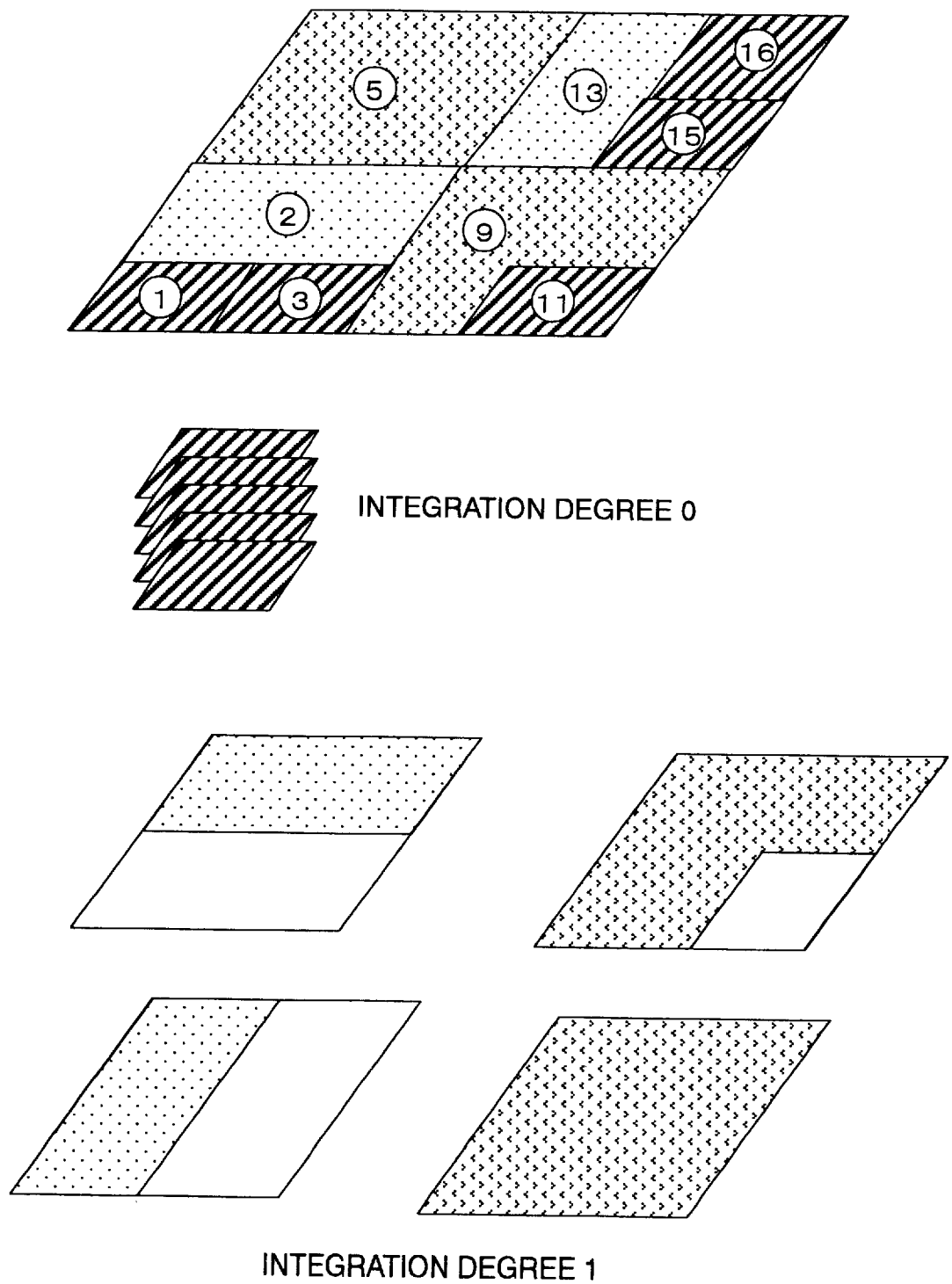
FIG. 7 illustrates numbering of the integrated meshes.

When the world is divided into search meshes of a fixed size, some search meshes include a large volume of map data while others include little. It is not efficient to assign a mesh number to a search mesh with no map data. Therefore, preferably some search meshes are integrated. Referring to FIG. 7, some search meshes are actively integrated, and a mesh number for one of the meshes in the integrated mesh represents the integrated mesh, so that the integrated mesh can be treated as a single search mesh.

In the example illustrated in FIG. 7, an area composed of 16 base meshes includes 9 meshes, i.e. 5 meshes at integration degree 0 and 4 meshes at integration degree 1.

[Example Search of Surrounding Area]

Figure 8:
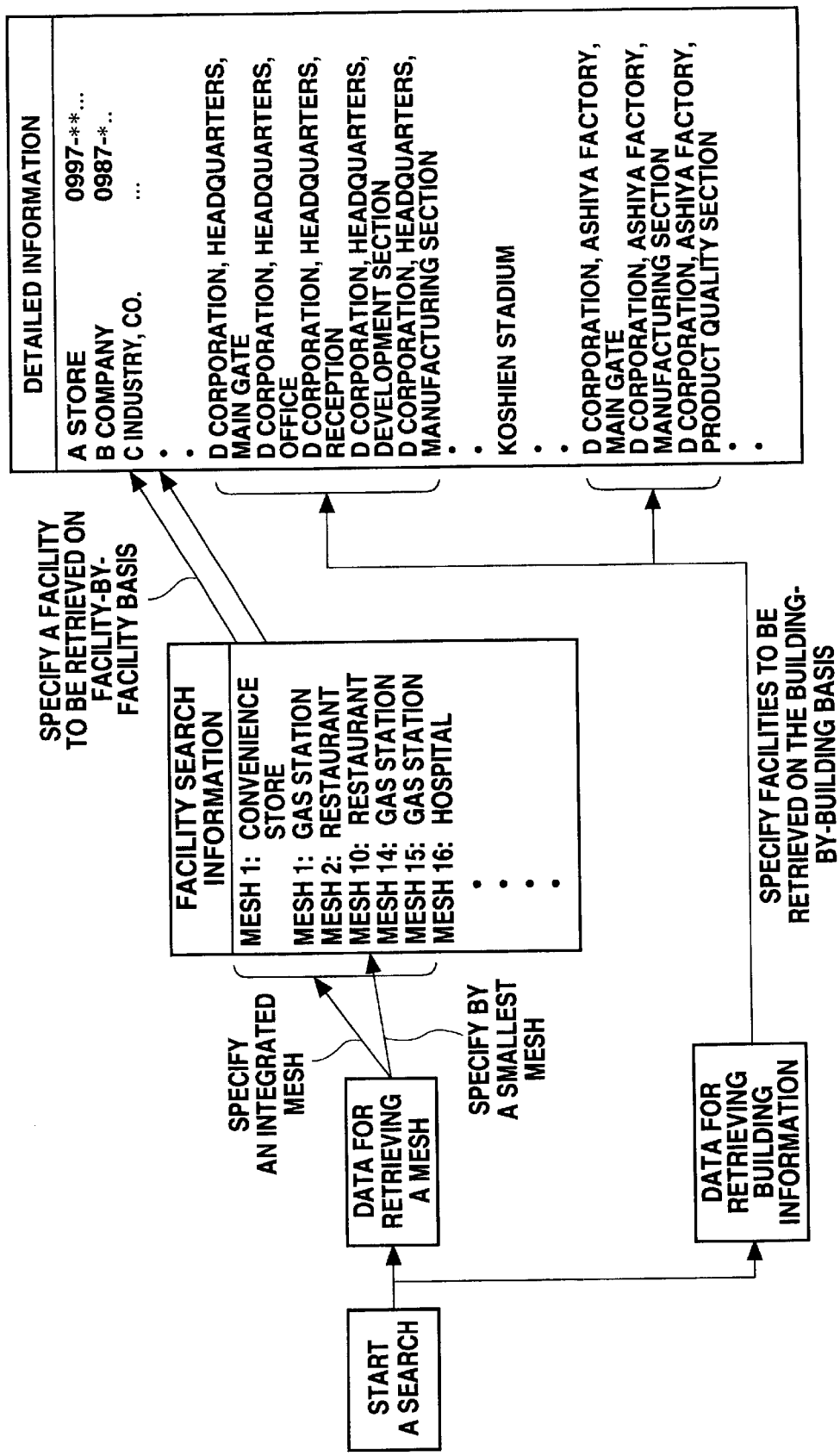
FIG. 8 illustrates a search for a facility.

A search for a facility near the current position will be discussed with reference to FIG. 8. According to the present embodiment, data on facilities and the like are separately stored as a different database from the map data used for display. As a result, the volume of data in the map database used for display is reduced, thereby enhancing the scrolling speed of the displayed map.

When searching for a facility, a user first inputs a category of the facility, such as "restaurant", to thereby specify the type code. The navigation ECU 10 determines, in view of the current position, a search range surrounding the current position, and identifies the corresponding search mesh number. The search range may be determined automatically using the default range, or by user input. The facility search information corresponding to the meshes in the search range is searched to determine if there is a facility of the specified category (such as a restaurant).

Thus, a facility search is performed on the data that is used for searches and stored according to mesh number. Such data for searches and detailed data described hereinafter are all stored separately from the map data for display. By specifying a mesh number, the area to be searched is determined and the facility search is performed.

It should be noted that when an integrated mesh is used, a search is performed by accessing data of the base mesh identified by the integrated mesh, so that meshes are retrieved by a collective readout. Because data is arranged according to mesh number, the data portions having proximate position coordinates are located in close proximity, and the storage medium can be efficiently accessed.

The facility search information includes a pointer to detailed information, and this pointer is used for reading out detailed data on the facility of interest. The detailed data is also stored according to mesh number. Therefore, a plurality of detailed data portions corresponding to a result of the surrounding area search are stored relatively close to each other, further enhancing access efficiency.

Further, according to the present embodiment, a search can be made by specifying a building. More specifically, when a user inputs data to specify the building, such as the name or address thereof, the building of interest is searched for based on the input criteria. A building ID is assigned to each building for identification. The detailed data portions for one mesh are arranged according to building ID. Thus, when facilities are to be searched for on a building-by-building basis, the data portions for facilities in one building are arranged in close proximity, to thereby further enhance access efficiency.

[Display of Search Result]

In the above-described search of a surrounding area, a category of a facility, such as a restaurant, is specified to search for a facility of interest. However, it is also possible according to the present embodiment to perform a search by specifying the name of a facility.

For example, the word "Toyota" can be input to search for a facility of this name. Map data over a predetermined range is then searched for facilities whose name begins with a variation of "Toyota". Three names, i.e. "Toyota School Foundation", "Toyota Motor Corporation", and "Toyota Automatic Loom Works", are retrieved as a result of the search, with the set of facilities starting with "Toyota Motor Corporation" including four facilities, namely, "Toyota Motor Corporation, Takaoka Factory", "Toyota Motor Corporation, Tsutsumi Factory", "Toyota Motor Corporation, Factory at Headquarters", and "Toyota Motor Corporation, Motomachi Factory".

However, as these four facilities have the same name "Toyota Motor Corporation", only three names, i.e. "Toyota School Foundation", "Toyota Motor Corporation", and "Toyota Automatic Loom Works", are displayed as a result of the search for "Toyota", as shown in FIG. 9. A mark or the like is displayed to indicate that a plurality of facilities are present under the name of "Toyota Motor Corporation", and the precise names of the facilities are displayed, as shown in FIG. 10, in response to an additional operation, such as touching the mark.

Thus, data to be displayed is divided into groups according to a predetermined rule and the data thus grouped is displayed, so that it is easier to see the displayed search result. Further, constituents of the group are displayed by a predetermined operation to specify a facility, and it is possible to obtain display of the location of the facility on the map or of the details.

While the data is divided into groups according to a match in the beginning of name in the above-described example, it may be divided according to a match in the beginning of address.

[Description of Data Records]

As described above, the map database 20 according to the present embodiment contains detailed data on facilities. The facility data does not always include the same type of description. More specifically, for some facilities data is present for all items, such as telephone number, capacity, and fees, while for other facilities no data exists for certain items. Therefore, if each item has a fixed length for each facility, many empty data segments are inefficiently generated.

Figure 11:
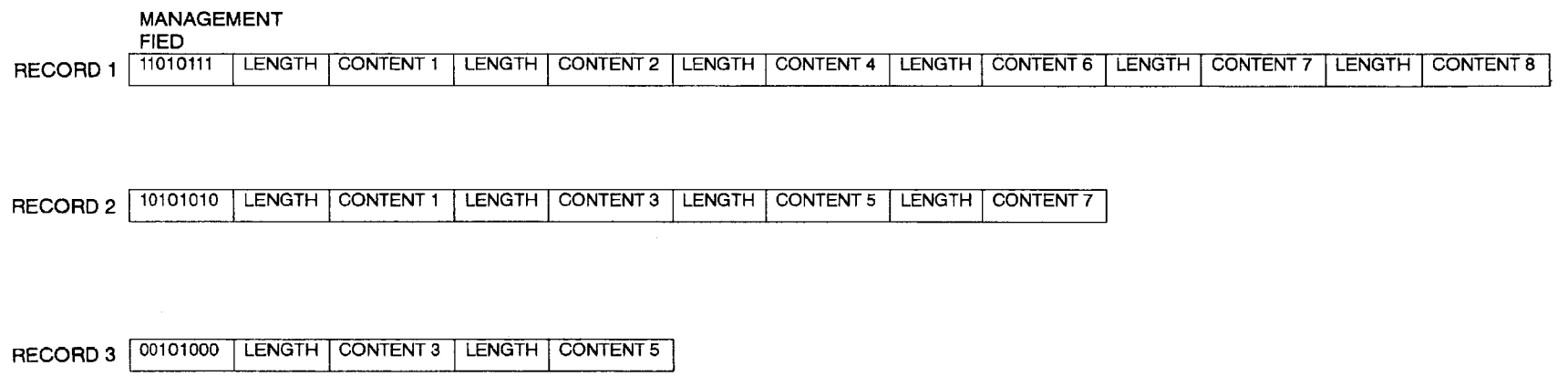

According to the present embodiment, a management field is provided for data of one facility (one record) to store data on whether or not data is present for each item, as shown in FIG. 11. According to the example shown in FIG.

11, the management field is formed of 8 bits, and a bit "1" indicates that corresponding data is present. In the illustrated example, the management field for a record 1 is "11010111", meaning that items 1, 2, 4, 6, 7, and 8 include data, and therefore the length and content of these items 1, 2, 4, 6, 7, and 8 are sequentially described. On the other hand, as a record 2 has a management field of "10101010", data for only the four items, namely items 1, 3, 5, and 7, are described. A record 3 has a management field of "00101000", and therefore only the data for items 3 and 5 are stored.

Thus, a management field is provided and each record has a variable length determined according to its content, so that stored.

Thus, a management field is provided and each record has a variable length determined according to its content, so that the storage area can be efficiently utilized for the database that contains records with many of which lack some segments.

It should be noted that, as a type code usually has a fixed length of 2 bytes, data on length can be omitted. It is also possible to omit the item in a management field which always requires description. Further, the management field need not be positioned at the head of each record, and it may be stored in a different memory area (such as a definition file of a record).

As described above, according to the present invention, meshes located in close proximity are numbered according to a predetermined rule, and map data is stored in numerical order, so that data portions for the meshes located in close proximity on the map are also positioned in close proximity in a storage medium. Because the map database is often used for a search over relatively wide areas and data portions for such areas are located in close proximity on the storage medium, efficiency of accessing the storage medium for a search is improved.

While in the examples used to illustrate the above embodiment, mesh members are assigned to respective search meshes following N pattern, z pattern can be equally adopted where desired.

What is claimed is:

1. A map data storage medium for storing map data divided into a plurality of meshes, wherein a predetermined number of meshes located in close proximity are sequentially assigned numbers starting from a base mesh in an order determined by a predetermined number assignment pattern, and such assignment is repeated using another mesh as the base mesh to assign numbers to respective meshes, and sorted map data corresponding to the meshes is stored in sequence corresponding to the assigned numbers.

2. A map data storage medium for storing map data divided into a plurality of meshes, wherein a predetermined number of meshes located in close proximity are sequentially assigned numbers starting froma base mesh in an order determined by a predetermined number assignment pattern, and such assignment is repeated using another mesh as the base mesh to assign numbers to respective meshes, sorted map data is stored according to the assigned numbers, and after numbers are assigned to said predetermined number of meshes, the meshes having the assigned numbers are collectively treated as one large mesh, said predetermined number assignment pattern is applied to other large meshes following the order determined by said predetermined number assignment pattern to sequentially assign numbers to adjacent meshes in the large meshes following the order determined by said predetermined number assignment pattern, a prescribed number of said large meshes are further collected to form an even larger mesh, and said predetermined number assignment pattern is applied to larger meshes following the order determined by said predetermined number assignment pattern to assign numbers to respective meshes in said larger meshes, and the above process is repeated to assign numbers to the entire map.

3. The map data storage medium according to claim 1, wherein said N pattern starts from a base mesh, and proceeds to a mesh above said base mesh, a mesh to the right thereof, and a mesh located upper right thereof.

4. A map data storage medium for storing map data divided into a plurality of meshes, wherein a predetermined number of meshes located in close proximity are sequentially assigned numbers starting from a base mesh in an order determined by a predetermined number assignment pattern, and such assignment is repeated using another mesh as the base mesh to assign numbers to respective meshes, sorted map data is stored according to the assigned numbers, an said map data includes a building ID for identifying a building.

5. The map data storage medium according to claim 1, wherein a plurality of meshes are collected to form an integrated mesh, and said numbers assigned to the meshes includes an integrated mesh number which is the number assigned to one of said plurality of meshes forming said integrated mesh.

6. A map information retrieving apparatus using the map data storage medium according to claim 1 to retrieve map information.

7. A navigation device using the map data storage medium according to claim 1 to perform route guidance.

8. A method of forming a map data storage medium for storing map data divided into a plurality of meshes, comprising the steps of:

sequentially assigning numbers to a predetermined number of meshes located in close proximity starting from one base mesh in an order determined by a predetermined number assignment pattern, said predetermined number assignment pattern including a basic pattern in which numbers are assigned to four meshes following an N pattern;

repeating said assigning step using another mesh as the base mesh to assign numbers to respective meshes; and storing sorted map data corresponding to the meshes in sequence corresponding to the assigned numbers.

* * * * *

UNITED STATES PATENT AND TRADEMARK OFFICE
CERTIFICATE OF CORRECTION

PATENT NO.   : 6,556,919 B2
DATED        : April 29, 2003
INVENTOR(S)  : Hidenobu Suzuki et al.

It is certified that error appears in the above-identified patent and that said Letters Patent is hereby corrected as shown below:

<u>Column 7,</u>
Line 39, change "z pattern" to -- Z pattern --.
Line 47, after "pattern," insert -- said predetermined number assignment pattern includes a basic pattern in which numbers are assigned to four meshes following a N pattern, --.
Line 56, change "froma" to -- from a --.

Signed and Sealed this

Eighteenth Day of May, 2004

JON W. DUDAS
*Acting Director of the United States Patent and Trademark Office*